June 8, 1937.    J. B. HARLEY    2,083,374
RECORDING AND REPRODUCING SYSTEM
Filed May 14, 1935    4 Sheets-Sheet 1
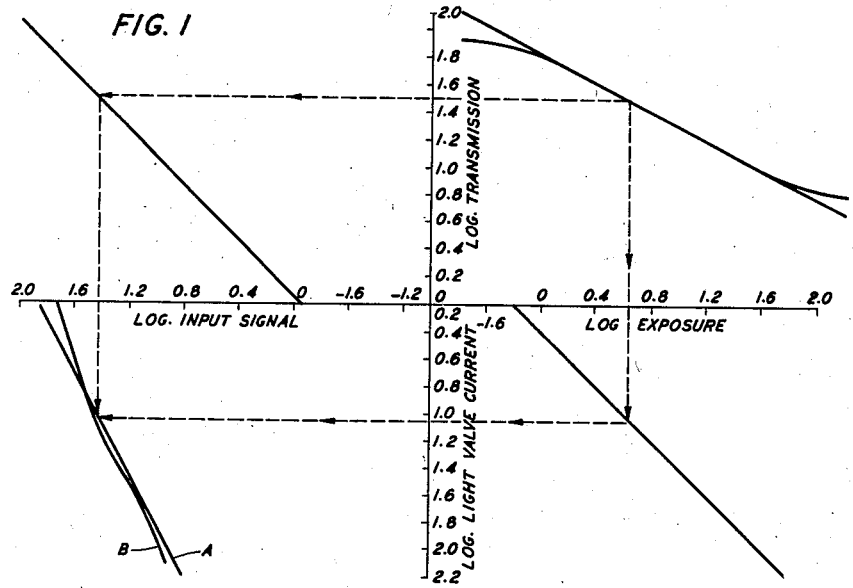
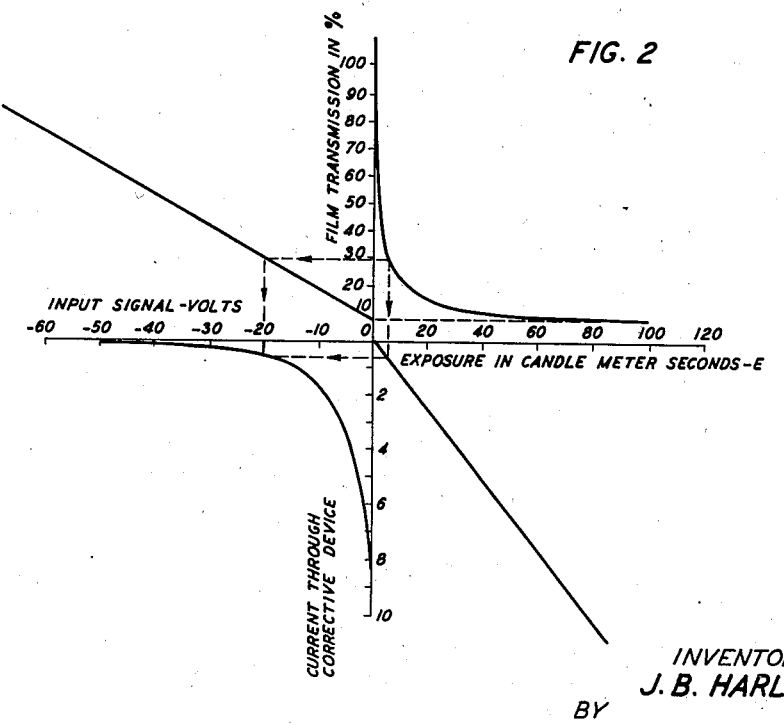
INVENTOR
J. B. HARLEY
BY
G. H. Heydt.
ATTORNEY June 8, 1937. J. B. HARLEY 2,083,374
RECORDING AND REPRODUCING SYSTEM
Filed May 14, 1935   4 Sheets-Sheet 2

INVENTOR
J. B. HARLEY
BY
G. H. Heydt
ATTORNEY

June 8, 1937.          J. B. HARLEY                2,083,374
              RECORDING AND REPRODUCING SYSTEM
                  Filed May 14, 1935        4 Sheets-Sheet 3

INVENTOR
J. B. HARLEY
BY
G. H. Heydt
ATTORNEY

June 8, 1937.  J. B. HARLEY  2,083,374
RECORDING AND REPRODUCING SYSTEM
Filed May 14, 1935  4 Sheets-Sheet 4

INVENTOR
J. B. HARLEY
BY G. H. Heydt.
ATTORNEY

Patented June 8, 1937

2,083,374

UNITED STATES PATENT OFFICE 2,083,374

RECORDING AND REPRODUCING SYSTEM

John B. Harley, New York, N. Y., assignor to Bell Telephone Laboratories, Incorporated, New York, N. Y., a corporation of New York Application May 14, 1935, Serial No. 21,379
In Great Britain August 24, 1934

13 Claims. (Cl. 179—100.3)

This invention relates to the recordation and reproduction of signal currents on a photographic film by the variable density method.

The object of the invention is, by electrical means, to compensate for the distortion produced by the characteristic of the photographic emulsion.

A feature of the invention is the use of an electronic device having an exponential characteristic as the compensating means.

Another feature of the invention is the provision of means for retaining the operating point on the characteristic of the electronic device despite changes in the wave shape of the applied signal currents.

A further feature of the invention is the provision of means for correcting for the effect of a change in the average transmission of the record being reproduced.

In the conventional method of recording signal currents on a photographic film to produce a record varying in density, the exposure of the film is restricted to the region of correct exposure of the emulsion, which, by definition, is the region in which the logarithm of the exposure is linearly proportional to the logarithm of the opacity produced after developing the record. On reproducing such a record, the light passing through the film will be directly proportional to the transmission of the film. The transmission of the film is the reciprocal of the opacity. Thus, the light passing through the film in reproduction will not be linearly proportional to the original exposure and the reproduced signal currents will be distorted in comparison with the original signal currents. Normally, the original record is not directly reproduced but is photographically printed on to the reproduction record. In this case, the distortion produced by the original record is corrected by a similar counter-distortion in the reproduction record, so that the signal currents reproduced from the reproduction record are undistorted.

Under certain conditions, it is advantageous to be able to reproduce the original record without distortion. For example, in the regular studio procedure, the original record is developed and printed, then the print is developed, and the developed print is played back for the information of the director. This procedure takes a considerable time. In accordance with the present invention, the original record, after development, may be played back at once, the distortion in the reproduced signal currents being corrected by a counter-distortion in the reproducing channel due to a suitable electronic device.

Also, under certain conditions, only one record may be made of the signal currents. For example, when signal currents are recorded on the narrow films, such as the sixteen millimeter film, the amateur frequently does not wish to incur the expense of having a print made from the film, but wishes to be able to reproduce the original record. In this case, a suitable electronic device may be introduced into the recording channel to predistort the signal currents in such manner that when recorded on the film, the distortion in the signal currents is corrected by the distortion introduced by the film, and the resultant record is undistorted.

The present invention may also be utilized in re-recording film records. For example, the signal currents reproduced from an original film recorded in the region of correct exposure may be counter-distorted by a suitable electronic device and recorded say on a disc record, or on a film recorded in the region of under exposure. Also, if the original record is undistorted, and is then reproduced, the reproduced signal currents may be predistorted and recorded on a photographic film to produce undistorted reproduction records.

As described hereinabove, when signal currents are recorded as a variable density record on a photographic film, the record produced is distorted with respect to the currents. Thus, if the signal currents originally varied as sine waves, the record will be a distorted sine wave. When such a record is reproduced, the reproduced signal currents are distorted sine waves, that is, when the wave is integrated over a complete cycle, the sum is not zero. The excess is thus equivalent to a unidirectional component which will vary with the average transmission of the record. When a signal current of this type is impressed on a corrective electronic device, the unidirectional component will tend to change the bias on the control electrode of the device and cause an error in the correction.

In accordance with the invention, a steady bias is applied to the control electrode of the corrective device and is balanced by a potential difference derived from the output current of the device. Thus, when the applied signal currents are not sinusoidal, the average output current will change and apply a potential to the control electrode that compensates for the effect of the unidirectional component in the signal currents.

When a photographic medium is exposed to the action of light, the exposure to which the medium is subjected is defined as the product of the intensity of the light multiplied by the time of exposure and may be expressed in candle-meter-seconds. Where the exposed medium is developed, dark areas are produced at the places where the medium was exposed to light. If a beam of light is impressed on one of these areas, a fraction of the energy of the beam of light will be transmitted through the film and a reciprocal fraction of the energy of the beam will be prevented from passing through the dark area by reflection or absorption. The fraction of the light energy which passes through the medium is termed the transmission, while the reciprocal fraction of the light which is prevented from passing is termed the opacity. The fractions representing the transmission and the opacity may also be expressed in percentage.

If a photographic medium is exposed to a known graduated series of exposures, a series of areas of graduated transmission will be produced. If the logarithm of the transmission of an area be plotted against the logarithm of the corresponding exposure, the resultant graph will, within certain limits, be a straight line which slopes negatively to form an angle $\gamma$ with the axis of exposures. The value of the exposure at which the prolongation of the line cuts the axis of exposures is known as the inertia.

Let a negative photographic record be printed by contact printing to form a positive photographic record, which, after development, is printed by contact printing to form a negative photographic record, and the process repeated to produce $n$ records. For convenience of analysis, the exposures are considered as being limited to the portion of the characteristic of the emulsion in which the relationship between the logarithm of the transmission and the logarithm of the corresponding exposure is a straight line, though the results attained are not strictly limited to this range.

Let $T$ = the transmission
$i$ = the inertia
$\gamma$ = the slope of the characteristic
$a$ = the constant of the printer.

Then $$T_1 = i_1{}^{\gamma_1} \cdot E_0{}^{-\gamma_1}$$
$$T_2 = i_2{}^{\gamma_2} \cdot (a_1 T_1)^{-\gamma_2} \qquad (1)$$
$$T_n = i_n{}^{\gamma_n} \cdot (a_{n-1} T_{n-1})^{-\gamma_n}$$

Solving for $T_n$ in terms of $E_0$, the initial exposure $$T_n = K_1 \cdot E_0{}^{(-1)^n \gamma_1 \gamma_2 \gamma_3 \cdots \gamma_n} \qquad (2)$$

where $K_1$ is a constant, formed of the successive products of $i_1 \ldots i_n$ and $a_1 \ldots a_{n-1}$, to the proper power.

If no over-all distortion of the record is produced, then when $n$ is an even integer $$\gamma_1 \cdot \gamma_2 \cdot \gamma_3 \cdots \gamma_n = 1 \qquad (3)$$

From this deduction, it is apparent that any one of the contact printing steps could be replaced by the step of optically scanning the record to produce a varying electrical current, modifying the amplitudes of the electrical current in the same manner that a film modifies the exposures to which it is subjected, and applying the modified currents to a light valve controlling the exposure to which a subsequent record is subjected.

Thus, if $i_i$ = the unmodified current
$i_0$ = the modified current then $$i_0 = C \cdot i_i{}^\gamma \qquad (4)$$

where $C$ is a constant and $\gamma$ is subject to Equation (3).

Let these results be applied to determine the predistortion required between the source of the signal currents and the recording device in order to produce an original or negative record which may be reproduced without distortion in a linear reproducing channel.

Let $E_0$ = the exposure of the record in the absence of signal currents
$-\dfrac{1}{K}$ = the signal current required to reduce the exposure to zero
$i_v$ = the signal current applied to the recorder $$E = E_0(1 + K i_v) \qquad (5)$$

Let the undistorted signal voltage $e_s$ be related to the distorted signal current $i_v$ supplied to the recorder by some function such that $f(0) = 0$, then $$i_v = f(e_s) \qquad (6)$$

If the record produced is to be undistorted, then $$T = T_0(1 + m e_s) \qquad (7)$$

Where $T_0$ = the transmission of the record in the absence of signal currents
$m$ = the reciprocal of the signal voltage that will produce 100 per cent modulation.

From Equation (1), the transmission of the record in the region of correct exposure may be approximately represented by the following equation:

$$T = i^\gamma E^{-\gamma} \qquad (8)$$

Where $i$ = the inertia of the emulsion
$E$ = the exposure of the record
$\gamma$ = the slope of the developed characteristic.

From Equations 5, 6, and 8

$$T = i^\gamma E_0{}^{-\gamma}[1 + K f(e_s)]^{-\gamma} \qquad (9)$$
$$= T_0[1 + K f(e_s)]^{-\gamma}$$

From Equations 7 and 9

$$f(e_s) = \frac{1}{K}\left[(1 + m e_s)^{-\frac{1}{\gamma}} - 1\right] = i_v \qquad (10)$$

In Equation 10, $i_v$ is the distorted signal current applied to the recording device. Let $i_p$ be the output current of the corrective device, then $$i_p = P i_v + Q \qquad (11)$$

in which $P$ and $Q$ are constants, determined by the circuit between the corrective device and the recording device. If the corrective device is a thermionic amplifier, and $e_g$ = the amplitude applied to the grid of the amplifier
$-b$ = the grid bias on the amplifier
$i_p$ = the plate current of the amplifier $$i_p = P i_v + Q = P\frac{1}{K}\left[(1 + m e_s)^{-\frac{1}{\gamma}} - 1\right] + Q$$
$$= \frac{P}{K}(1 + mb + m e_g)^{-\frac{1}{\gamma}} + \left(Q - \frac{P}{K}\right) \qquad (12)$$

In this equation $P$, $Q$ and $m$ are arbitrary constants and may be chosen so that $$m = -\frac{1}{b}$$
$$Q = \frac{P}{K}$$

Then $$i_p = Q(m e_g)^{-\frac{1}{\gamma}} = Q' e_g{}^{-\frac{1}{\gamma}} \qquad (13)$$

It will be noted that the corrective device must have a non-linear characteristic, and that the exponent of the characteristic of the corrective device is the reciprocal of the slope of the logarithmic characteristic of the record.

Thermionic amplifiers having an exponential characteristic which may be designed or selected to satisfy Equation 13 are described in an article "Reduction of Distortion and Cross-Talk in Radio Receivers by Means of Variable Mu Tetrodes" by S. Ballatine and H. A. Snow, Proceedings Institute of Radio Engineers, Vol. 18, Number 12, page 2102, December 1930.

In a similar manner, a non-linear device may be utilized to compensate for the distortion produced when a photographic record developed to a gamma other than unity is reproduced. In this case, the equation of the compensating device should be of the form:

$$i_2 = C e_1^{-\frac{1}{\gamma}} + D \quad (14)$$

in which
$e_1$ = the voltage input to the device
$i_2$ = the output current from the device
C and $d$ are arbitrary constants.

It will be noted again that the exponent of the characteristic of the compensating device is the reciprocal of the slope of the logarithmic characteristic of the record.

In some cases where a negative record is printed to make a positive record, the development is not correctly chosen and the positive record is distorted. It is well known that the over-all gamma is equal to the product of the gamma of the negative record and the gamma of the positive record.

$$\gamma = (-\gamma_n)(-\gamma_p) \quad (15)$$

In this case, the equation of a compensating device which will correct the distortion when the positive print is reproduced should be $$i_2 = F e_1^{\frac{1}{\gamma}} + G \quad (16)$$

in which $e_1$ = voltage input to the device
$i_2$ = output current of the device
F and G are arbitrary constants.

It will be noted that in this case the exponent of the corrective device is the reciprocal of the over-all gamma while in the other cases, the exponent was the reciprocal of the negative gamma. In photographic theory, gamma is the slope of the curve showing the relation between the logarithm of the opacity and the logarithm of the exposure. In reproducing a film sound record by transmitted light, it is the transmission of the record which controls the reproduction, and not the opacity. As the transmission is the reciprocal of the opacity, in these cases, it is the slope of the curve of the logarithms of the transmission and exposure which is of interest, thus gamma will be a negative quantity. However, when a positive print is made, the over-all gamma, which is the product of two negative quantities, will be positive.

Thus, when proper allowance is made for this conventional mathematical difference, it is seen that in every case, the exponent of the characteristic of the compensating device is the reciprocal of the slope of the logarithmic characteristic of the record.

In the drawings:

Figs. 1 and 2 illustrate a graphical method of determining the compensation required for a slope less than unity;

Figure 5:
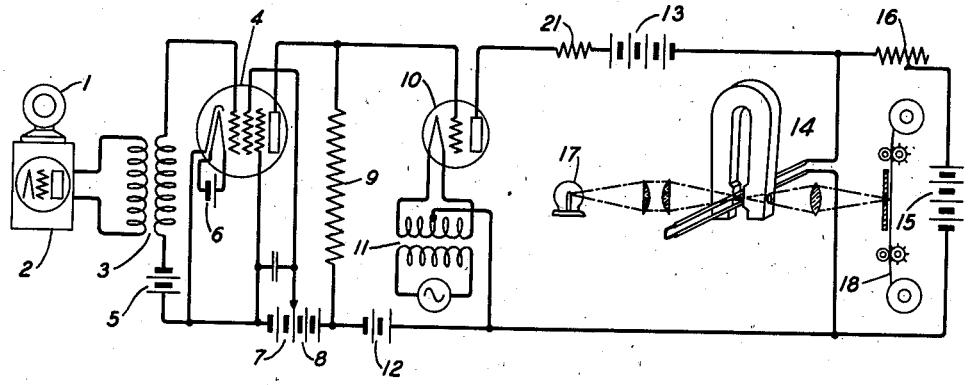
Figure 6:
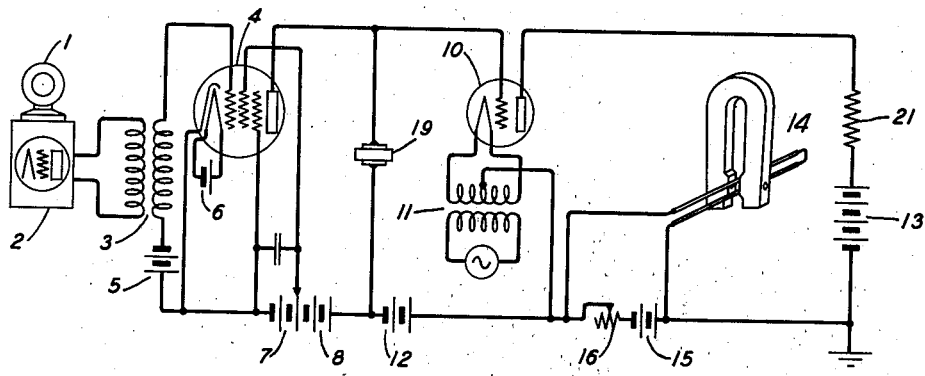
Figure 7:
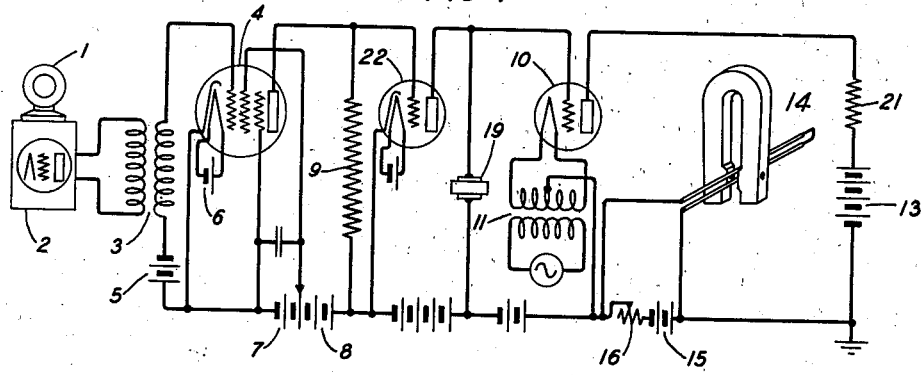
Figure 8:
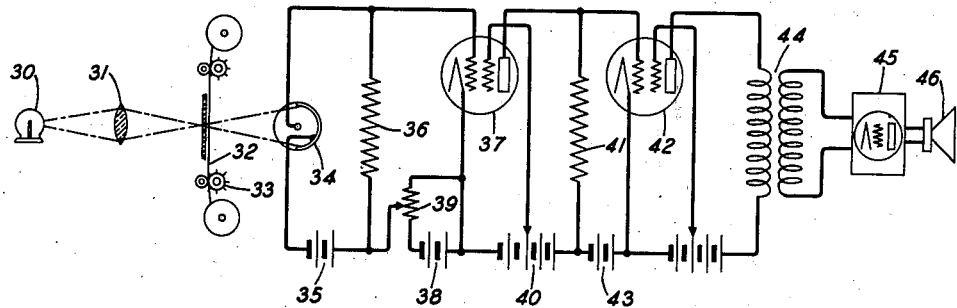
Figure 9:
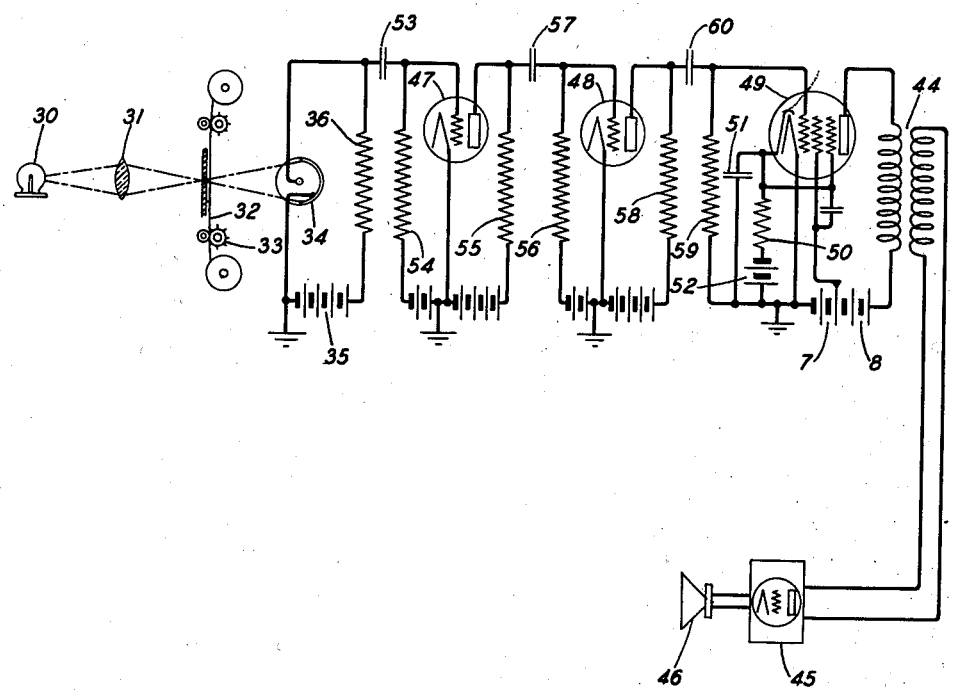

Fig. 5 discloses a system for recording an undistorted density record, or compensating in recording for the distortion of a two film system where the slope is greater than unity;

Fig. 6 discloses a recording system in which two compensating elements are used;

Fig. 7 discloses a system for recording an undistorted negative using two compensating elements;

Fig. 8 discloses a system for reproducing undistorted signal currents from a distorted record; and Fig. 9 discloses an alternative system to Fig. 8.

In Fig. 1, in the upper right-hand quadrant, the characteristic curve of a photographic emulsion which is widely used in commercial sound recording is shown. In the usual photographic practice, the logarithm of the opacity of the developed record would be plotted against the logarithm of the exposure to which the emulsion was subjected, and a straight line slanting upward to the right would be produced. However, as film sound records are usually scanned by transmitted light, it is more convenient to plot the logarithm of the transmission of the developed record against the logarithm of the exposure and, in this case, a straight line slanting downward to the right will be produced. The slope of the line produced when the logarithm of the opacity is plotted against the logarithm of the exposure is known as the gamma of the record. As the transmission is the reciprocal of the opacity, the slope of the line produced when the logarithm of the transmission is plotted against the logarithm of the exposure will be the negative of the gamma.

When the record is scanned in the usual manner by transmitted light, the reproduced signal currents will vary in accordance with the transmission of the film, thus, for an undistorted reproduction of the recorded signals, the transmission of the developed record must vary linearly with the original signal. In logarithmic plotting, this ideal linear relation will be a straight line inclined at 45 degrees to the axes as shown in the upper left-hand quadrant of Fig. 1. Thus, corresponding points on the curve in the upper right quadrant may be transferred by the line in the upper left quadrant to the lower left quadrant.

In the lower right quadrant of Fig. 1 the relationship between the logarithm of the current supplied to the light valve or other recording device and the logarithm of the exposure produced by this current has been plotted. If the recording device does not itself produce any distortion, there will be a linear relationship between the current to the recording device and the exposure produced, and the relationship will be, as shown, a straight line inclined at 45 degrees to the axes. With recording devices which produce distortion, the plot in the lower right quadrant may be a curve, or may be a straight line inclined at some angle other than 45 degrees to the axes. Corresponding points on the curve in the upper right quadrant may be transferred by the line in the lower right quadrant to the lower left quadrant. The point where the projection of a point through the lower right quadrant intersects the projection of the same point through the upper left quadrant will be a point on the characteristic of the corrective device, as shown by the dotted lines. The characteristic of the required corrective device thus plotted, is shown as curve A in the lower left quadrant, and it will be noted that the slope of this characteristic is the reciprocal of the slope of the characteristic of the emulsion. Curve B is the characteristic of a commercial vacuum tube, a Western Electric Company 291—A vacuum tube, selected at random. It will be noted that this vacuum tube gives satisfactory compensation, though closer compensation may be secured by more careful selection or by a specially designed vacuum tube.

In Fig. 2, the curves shown in Fig. 1 have been replotted in linear coordinates, to produce a conventional characteristic of the corrective device. In plotting such curves the apparent scale of the various axes may be changed by the interposition in the recording circuit at suitable points of amplifiers or attenuating networks.

Figure 3:
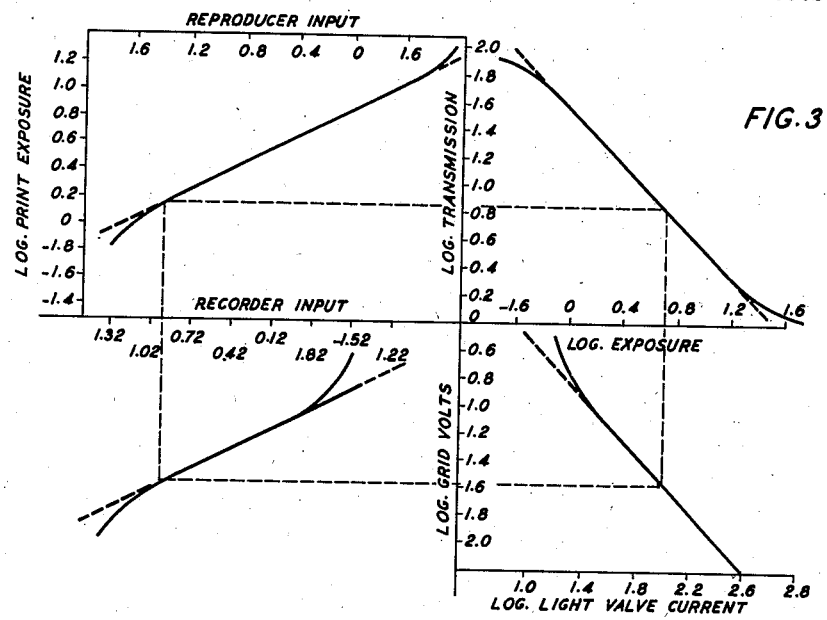
Figs. 3 and 4 illustrate a graphical method of determining the compensation required for a slope greater than unity.
Figure 4:
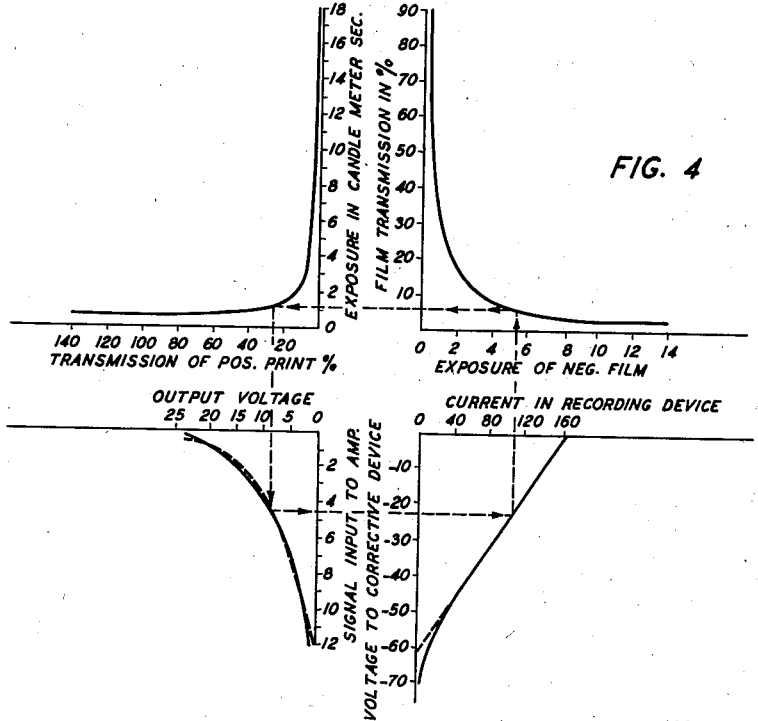

Figs. 3 and 4 illustrate a graphical method of determining the characteristic of the corrective device required to compensate for the distortion produced when a positive copy is printed from a negative record and developed so as to make the over-all gamma other than unity. In the upper right quadrant of Fig. 3 the logarithm of the exposure impressed on the negative record is plotted against the logarithm of the transmission of the developed negative. The transmission of the developed negative is a measure of the exposure of the positive print, in accordance with Equation 1 and may, therefore, be considered proportional. In the upper left quadrant the logarithm of the exposure impressed on the positive print is plotted against the logarithm of the transmission of the positive print. When the positive print is scanned by transmitted light, the voltage produced in the load resistance of the photocell will be proportional to the transmission of the developed positive print. The voltage produced in the load resistance of the photocell is usually linearly amplified in the photocell amplifier. The transmission of the positive print may, therefore, be regarded as the input signal to the reproducing channel which for faithful reproduction should be proportional to the original recorder input signal.

The recorder input signal may be regarded as proportional to the control voltage of the corrective device since no distortion of the signal occurs ahead of this point. In the lower right-hand quadrant is plotted the logarithmic characteristic of the power amplifier associated with the corrective tube. Since no distortion of the signal occurs, this characteristic appears as a straight line having a slope of 45 degrees. The grid voltage of this amplifier is plotted in terms of the logarithm of the voltage above that value which would make the output of the amplifier zero were its characteristic absolutely linear. This is done merely as a convenience in plotting the logarithmic functions. If the reproducing system is to produce no over-all distortion, the output current of the corrective device must correspond to the exposure originally applied to the negative record. Thus, points on the characteristic curve of the negative record may be projected through the upper left-hand quadrant and also through the lower right-hand quadrant, to the lower left-hand quadrant. The intersection of these projections will give the characteristic curve of the required corrective device. It will be noted that the slope of the characteristic curve of the corrective device is the reciprocal of the slope of the over-all characteristic curve of the negative and positive records combined.

In Fig. 4 the logarithmic curves of Fig. 3 have been replotted in linear coordinates. In the lower right-hand quadrant, the characteristic curve of a commercial vacuum tube circuit, comprising two Western Electric 252—A vacuum tubes in parallel, has been plotted. In the lower left-hand quadrant the characteristic of a Western Electric 245—A vacuum tube is plotted in dotted lines. It will be noted that this vacuum tube will give satisfactory results as a corrective device when the slope of the over-all characteristic of both films is about 2.0 as compared to the desired characteristic plotted in the same quadrant.

Fig. 5 illustrates in diagrammatic form a recording circuit, with corrective device, adapted to practice the method shown in Figs. 1 and 2. Signal currents from a suitable source, such as a microphone 1, are suitably amplified in the amplifier 2 and applied through a transformer 3 to the input circuit of the corrective device 4. A biasing potential from a suitable source, represented by the battery 5, is applied to the control electrode of the corrective device 4, and renders the control electrode negative with respect to the cathode. The value of this voltage is given on Fig. 2 and is the value of grid voltage determined by the point where the dotted line representing the no-signal conditions of the recording system crosses the horizontal axis in the left-hand quadrant at a value of —20 input signal voltage. The cathode may be energized by a heater element supplied with current from any suitable source such as the battery 6 or from an alternating current circuit. The screen grid of the corrective device is suitably biased by the battery 7, while the suppressor grid is connected to the cathode. The anode is supplied with current from a suitable source, such as the battery 8, through the coupling resistor 9. The anode of the corrective device 4 is directly connected to the control electrode of the amplifier 10. The anode current flowing in the resistor 9 will produce a negative bias on the control electrode of the amplifier 10.

The cathode of the amplifier 10, which may be a filament or an indirectly heated cathode, is energized by power from a suitable source, such as the transformer 11 connected to the supply mains. A small bias may be added from the battery 12 to reduce the alternating hum and improve the fidelity of the amplification of the amplifier 10. A battery 13 supplies power through the movable elements of the recording device 14 to the anode of the amplifier 10. A battery 15 and variable resistor 16 supply a biasing current to the movable elements of the recording device 14, so that the recording device may be adjusted to operate over any desired range of the characteristic of the amplifier 10, and, also, that the recording device may produce a negative record. That is, when the current through the amplifier 10 is a maximum, the elements of the recording device will be in a position to give minimum exposure, and when the current from the amplifier 10 is a minimum the elements of the recording device will be held in the position for maximum exposure. A resistance 21 in series with the plate circuit of amplifier 10 may be utilized to straighten the characteristic of the amplifier.

The invention is applicable to any type of recording device, but, for convenience, a conventional two-ribbon light valve is shown. Light from a source 17 is focused on a moving film 18, and the time of exposure of the film is varied by the moving elements of the light valve 14 to produce a variable density record.

The signal currents from the transformer 3 are exponentially amplified by the corrective device 4 and cause the anode current of the amplifier 10 to vary inversely with the modified signal currents in the anode circuit of the corrective device 4, thus destroying the balance of currents in the movable elements of the recording device 14, and causing the movable elements of the recording device 14 to move in phase with, but not linearly proportional to the signal currents in the transformer 3. The recording device 14 thus produces a record on the moving film 18 which is correctly distorted to compensate for the distortion produced when the film 18 is developed to a constant gamma.

The circuit Fig. 5 may also be used to compensate during recording for the distortion which would otherwise be present in a sound print when the over-all gamma of the print and negative is greater than unity. The characteristics of the elements of the circuit are shown on Figs. 3 and 4. The essential difference in the operation of the circuit is that the battery 15 and resistance 16 are adjusted so that the elements of the recording device are held in a position of minimum exposure when the current flowing through the recording device from the amplifier 10 is a minimum.

The recording system disclosed in Fig. 6 is generally similar to the system disclosed in Fig. 5, and as similarly numbered elements have similar functions, a detailed description of the system is not necessary.

The linear resistor 9 in Fig. 5, may be replaced by a non-linear resistor 19 in Fig. 6. The non-linear resistor 19 may be a rod of the substance called "Thyrite", described in the General Electric Review, Vol. 33, No. 2, Feb. 1930, page 92 and No. 6, page 350, June 1930. The effect of this non-linear resistor is to decrease the effective exponent of the characteristic of the device 4. Also, with a suitable non-linear resistor 19 and a suitable manipulation of elements 15 and 16, the results accomplished by the circuit Fig. 5 may be obtained with the circuit Fig. 6 even when the corrective device 4 has a linear characteristic.

Fig. 7 discloses a recording system for pre-distorting the signal currents in accordance with the method shown in Figs. 1 and 2 and thus to produce a negative record from which the signals may be reproduced without distortion by a conventional reproducing channel. The signal currents from the microphone 1 are applied to the corrective device 4 and produce a voltage on the control electrode of the amplifier 22. The amplifier 22 produces a voltage across the non-linear resistance 19 which is applied to the control electrode of the amplifier 10. In this case, the effect of the non-linear resistance 19 is such as to increase the effective exponent of the corrective device 4. The recording device 14 is connected in serial relationship in the output circuit of the amplifier 10 in a similar manner to the connection of Fig. 6. In this case the elements of the valve are either normally in a position of minimum exposure or are biased to that position with the battery 15 and resistance 16 when a minimum current flows through amplifier 10.

In the upper right quadrant of Fig. 2, the desired transmission of the original or negative record is plotted against the exposure required to produce this transmission in the developed record. This curve shows that a transmission of 50 per cent requires an exposure of one and one-half candle-meter second, a transmission of 30 per cent representing the unmodulated record transmission requires an exposure of about five candle-meter seconds, while a transmission of 10 per cent requires an exposure of about forty candle-meter seconds. On the other hand, recording devices are normally adjusted mechanically so that, in the absence of signal currents, the exposure produced by the recording device is in the middle of the desired range of exposures, and when the maximum amplitude of signal currents are applied to the recording device, the exposure will be equally varied above and below the middle over the whole range of desired exposure. Now, when such a recording device is used to produce the result shown in Fig. 2, the recording device must be so adjusted that in the absence of signal currents, the exposure is reduced to about five candle-meter seconds, or, with the circuit shown in Fig. 5, the corresponding voltage on the control electrode of the corrective device 4 is a negative twenty volts. This is the fixed bias voltage 5 applied to the control electrode to which the signal voltage is added algebraically. The algebraic sum of these voltages being the control electrode voltage Fig. 5. With 20 volts on the control electrode, the current through the valve is adjusted to give an exposure of five candle-meter seconds by changing the values of the battery 15 and the resistance 16. Further, as shown in the lower left-hand quadrant of Fig. 2, when the signal voltage increases the negative potential applied to the control electrode of the corrective device, the current delivered to the recording device should decrease and vice versa. As shown in Fig. 5, when the signal voltage applied to the control electrode of the corrective device 4 increases the negative biasing potential, the potential difference across the resistor 9 applied to the control electrode of the amplifier 10 will decrease the biasing potential applied to this electrode and the anode current of the amplifier 10 delivered to the recording device 14 will increase and thus reduce the current from the battery 15 flowing in the recording device.

In Fig. 4, if the reproduction of the record is to be without distortion, the transmission of the positive print should vary linearly with the original signal. Assume that the transmission of the unmodulated developed positive print is 25 per cent and that this transmission is to be varied in accordance with the signal currents from 2 per cent to 48 per cent. As shown in the lower quadrants of Fig. 4, the current which should be supplied to the recording device in recording the original or negative record under ideal conditions, to produce this variation in the transmission of the positive print will be 14 milliamperes for transmission 2 per cent, 104 milliamperes for transmission 25 per cent and 144 milliamperes for transmission 48 per cent. Thus, in Fig. 5 the potential of the battery 12, the resistors 16 and battery 15 should be adjusted so that in the absence of signal currents, the current flowing in the recording device 14 is 104 milliamperes.

In the upper right-hand quadrants of Figs. 1 and 2, the exposure impressed upon an original or negative record is plotted against the resulting transmission produced in the developed record. When the exposure impressed on the record is limited to the region of correct exposure in which the slope of the logarithmic characteristic of the emulsion is constant, the resultant transmission of the developed record is not linearly related to the exposure. Thus, when such a record is scanned by a linear reproducing system, the reproduced currents are distorted with respect to the original signal. By an analysis similar to the analysis given hereinabove it may be shown that the distortion in the reproduced currents may be corrected by transmitting the distorted currents through a non-linear transducer having an exponential characteristic, the exponent of the characteristic of the transducer being the reciprocal of the slope of the logarithmic characteristic of the record.

A system for producing a compensation of this character is illustrated in Fig. 8. Light from a source 30 is focused by a lens 31 to form a narrow line of light on the record 32 moved at constant speed by the sprockets 33. The light transmitted through the record excites a photosensitive device 34, such as a photoelectric cell. The battery 35 impresses a potential on the anode of the photoelectric cell 34, through the resistor 36. When light is impressed on the cathode of the photoelectric cell 34, the potential difference between the ends of the resistor 36 will vary in accordance with the variations in the impressed light. The varying potential difference between the ends of the resistor 36 is applied to the control electrode and cathode of the amplifying tetrode 37 which may be a screen grid tube or a series of similar stages of amplification. The battery 38 and potentiometer 39 supply a controllable negative potential to the control electrode of the amplifying tube 37. The battery 40 supplies a positive potential to the screen grid and supplies current to the anode circuit through the resistor 41. The resistor 41 applies a negative biasing potential to the control grid of the non-linear transducer 42, which may be, as shown, a variable mu vacuum tube or may be a non-linear resistor such as a copper-copper oxide couple or a piece of the ceramic material known as thyrite. The battery 43 may place an added biasing potential on the control electrode of the variable mu tube 42, to fix the operating point in the correct part of the characteristic curve of the tube 42. The output of the tube 42 may be supplied through a transformer 44 to further amplifiers 45 and thence to a reproducing device such as the reproducer 46.

The average transmission of the record 32 will cause a constant current to flow in the resistor 36 which will cause a constant current to flow in the resistor 41. The biasing potential applied to the control electrode of the corrective device 42 will thus vary with the average transmission of the record 32 and may not be of the correct value to fix the operating point in the correct part of the characteristic curve of the device 42. This effect may be corrected by adjusting the potentiometer 39.

In certain records, such as those made by the so-called "noise reduction" recording systems, the average transmission of the record is continually changing, and manual adjustment of the biasing potential applied to the control electrode of the corrective device is not satisfactory. In such cases, the system shown in Fig. 9 may be used and the various stages of amplification may be resistance-capacity coupled in place of the resistance coupling shown in Fig. 8.

The record 32 is scanned, as described above, and excites the photoelectric cell 34 to produce a difference of potential between the ends of the resistor 36 which varies with the transmission of the record. This fluctuating voltage is amplified in the multi-stage resistance capacity coupled amplifier associated with the amplifying vacuum tubes 47 and 48 and applied to the grid resistor 59 of the corrective tube 49.

This grid resistor 59 is connected to the control electrode of the corrective device 49 and through the capacitor 51 to the cathode. The voltage supplied to the grid of the corrective device 49 by the drop across 59, due to the distortion in the record 32, is not sinusoidal, that is, the positive half waves of the voltage are not equal to the negative half waves. The voltage supplied is thus equivalent to a sinusoidal voltage superimposed upon a component which at any instant is equivalent to a constant voltage. This constant component of the signal voltage will tend to change the steady biasing potential applied to the corrective device 49, similarly to the change due to the variation in the average transmission of the record. This effect is compensated by the resistor 50, the capacitor 51 and the battery 52.

Current flows from the battery 8 through the primary winding of the transformer 44, to the anode of the device 49, thence to the cathode and through the resistor 50 and battery 52 back to battery 8. This current produces a potential difference across the resistor 50 which makes the control electrode of the device 49 negative with respect to the cathode. The resistor 50 has a value such that when the desired anode current of the device 49 flows through it, a potential will be applied to the control electrode which is several times that required to produce the desired anode current. The battery 52 which is in serial relationship with the resistor 50 is poled so that its potential opposes the drop across the resistor 50, the algebraic sum of the potential drops across the battery 52 and the resistor 50 being the desired control electrode potential of 49. When a distorted signal voltage is applied to the control electrode of the device 49 across the resistor 59, the average potential of the control electrode will tend to change, thus producing a change in the average anode current. The change in the average anode current increases the potential difference produced across the resistor 50 and changes the potential difference across the capacitor 51. This change in the potential difference across the capacitor 51 restores the average potential of the control electrode to a close approximation of its original value. The high value of the resistance 50 made possible by the use of the battery 52 enables the circuit to maintain the correct anode current of the device 49 within very close limits. The resistor 50 and the capacitor 51 control the timing of the circuit. The timing should be such that the degenerative effect of the coupling between the anode circuit and the control electrode circuit of the device 49 afforded by the elements 50, 51, and 52 will not be serious for the lowest frequency it is desired that the circuit should deliver undistorted to the reproducer 46. The time constants of the other elements of the circuit, namely, the elements 36, 53, and 54, the elements 55, 57, and 56, and the elements 58, 60, and 59 should be the same as or have a larger value than the time constant of the elements 50 and 51 to afford the greatest possible reduction of transient disturbances set up in the circuit ahead of the device 49 by changes in the density of the film 32.

What is claimed is:

1. The method of recording signal currents on a photographic film which comprises transmitting the signal currents through an electronic device having an exponential characteristic, recording the transmitted currents as a variable density record in the region of correct exposure of a photographic emulsion and developing the exposed record to a gamma other than unity which is the reciprocal of the exponent of the characteristic of the device.

2. The method of reproducing signal currents from a variable density record of constant gamma other than unity which comprises reproducing the signal currents from said record, transmitting the reproduced signal currents through an electronic device, adjusting the characteristic of said device to have an exponent equal to the reciprocal of the gamma, and reproducing the transmitted signal currents.

3. The method of compensating for the distortion produced by recording signal currents as a variable density record of substantially constant gamma other than unity which comprises transmitting the signal currents through an electronic device having an exponential characteristic, adjusting the operating point on the characteristic of said device to make the exponent of said characteristic equal to the reciprocal of the gamma, and reproducing the compensated signal currents.

4. The method of reproducing a distorted variable density record of substantially constant gamma which comprises optically scanning the record, exciting a light sensitive device with the light modulated in scanning, transmitting the output of the light sensitive device through an electronic device having an exponential characteristic, adjusting the operating point on the characteristic of said electronic device to make the exponent of the characteristic equal to the reciprocal of the gamma of the record and reproducing the output of the electronic device.

5. In a reproducing system, a distorted variable density record of substantially constant gamma, means for scanning said record, a light sensitive device excited by light modulated by said scanning, means for amplifying the output of said light sensitive device, a variable mu tetrode controlled by said amplified output, a source of constant positive potential and a resistor connected between the cathode and the anode of said tetrode, this potential being also connected between the cathode and the screen grid of said tetrode, and a capacitor connected across said potential and resistor.

6. The method of correcting the distortion due to a variable density record having a logarithmic characteristic of constant slope other than unity which comprises transmitting the signal currents through a non-linear transducer having an exponential characteristic, the exponent of said characteristic being equal to the reciprocal of the slope of the characteristic of the record.

7. The method of recording signal currents on a photographic film which comprises transmitting the signal currents through a non-linear transducer having an exponential relationship between the input and the output currents, recording the modified currents as a variable density record in the region of correct exposure of a photographic emulsion, developing said record to a constant gamma, printing said record in the region of correct exposure of a second photographic record, and developing said second record to a constant gamma other than unity, such that the product of said gammas is equal to the exponent of said transducer.

8. The method of correcting the distortion present in signal currents reproduced from a variable density print of constant gamma made from a variable density record of constant gamma when the product of said gammas is other than unity which comprises transmitting the reproduced signal currents through a non-linear transducer having an exponential characteristic, adjusting the characteristic of said transducer to be the reciprocal of the product of said gammas and reproducing the corrected signal currents.

9. In a recording system, a source of signal currents, a recording channel for transmitting said currents, a recording device actuated by the output of said channel, a non-linear transducer having an exponential characteristic inserted in said channel, and a variable density record produced by said recording device and developed to a constant gamma other than unity which is the reciprocal of the exponent of the characteristic of said transducer.

10. In a recording system, a source of signal currents, a recording channel for transmitting said currents, a recording device actuated by the output of said channel, an electronic device having an exponential input-output characteristic inserted in said channel, and a variable density record produced by said recording device and developed to a constant gamma other than unity which is the reciprocal of the exponent of the characteristic of said device.

11. In a sound recording system, a source of signal currents, a thermionic amplifier connected to said source, said amplifier having an exponential input-output characteristic, a linear amplifier connected to the output of said exponential amplifier, means coupling said amplifiers comprising a non-linear resistor having an exponential characteristic, a recording device controlled by the output of said linear amplifier and a variable density record produced by said recording device and developed to a constant gamma other than unity which is the reciprocal of the exponent of said thermionic amplifier as modified by said coupling means.

12. In a sound recording system, a source of signal currents, a thermionic amplifier connected to said source, said amplifier having an exponential input-output characteristic, a linear amplifier connected to the output of said exponential amplifier, a recording device connected in serial relationship in the output circuit of said linear amplifier, a battery and a variable resistor in serial relationship connected in parallel relationship with said recording device, said battery being so poled that when the current in the output circuit of said linear amplifier is a maximum the exposure produced by said recording device is a minimum and a variable density record produced by said recording device and developed to a constant gamma other than unity which is the reciprocal of the exponent of said thermionic amplifier.

13. In a sound recording system, a source of signal currents, a thermionic amplifier connected to said source, said amplifier having an exponential input-output characteristic, a linear amplifier connected to the output of said exponential amplifier, means coupling said amplifiers comprising a non-linear resistor having an exponential characteristic, a light valve connected in serial relationship in the output circuit of said linear amplifier, a battery and a variable resistor in serial relationship connected in parallel relationship with said recording device, said battery being so poled that when the current in the output circuit of said linear amplifier is a maximum the exposure produced by said light valve is a minimum and a variable density record produced by said light valve and developed to a constant gamma other than unity which is the reciprocal of the exponent of said thermionic amplifier as modified by said coupling means.

JOHN B. HARLEY.